(12) United States Patent
Sato et al.

(10) Patent No.: US 7,436,147 B2
(45) Date of Patent: Oct. 14, 2008

(54) MOTOR DRIVING APPARATUS

(75) Inventors: Ikuya Sato, Hino (JP); Akihiro Odaka, Hino (JP)

(73) Assignee: Fuji Electric FA Components & Systems Co., Ltd., Tokyo (JP)

( * ) Notice: Subject to any disclaimer, the term of this patent is extended or adjusted under 35 U.S.C. 154(b) by 129 days.

(21) Appl. No.: 11/700,886

(22) Filed: Feb. 1, 2007

(65) Prior Publication Data
US 2007/0182360 A1  Aug. 9, 2007

(51) Int. Cl.
*H02P 7/00* (2006.01)
(52) U.S. Cl. .................. 318/800; 318/432; 363/34; 363/37
(58) Field of Classification Search ........... 318/432, 318/434, 800, 807, 808, 812; 363/34, 37, 363/41
See application file for complete search history.

(56) References Cited
U.S. PATENT DOCUMENTS
4,894,763 A * 1/1990 Ngo ........................ 363/35
5,909,367 A * 6/1999 Change ..................... 363/163
6,058,028 A * 5/2000 Czerwinski ................. 363/44
6,295,215 B1 * 9/2001 Faria et al. .................. 363/37

FOREIGN PATENT DOCUMENTS
JP 2004-180390 6/2004

* cited by examiner

*Primary Examiner*—Rina I Duda
(74) *Attorney, Agent, or Firm*—Manabu Kanesaka (57) ABSTRACT

A motor driving apparatus drives a motor by means of an AC/AC direct converter such as a matrix converter. The motor driving apparatus is provided with a current detecting section for detecting motor currents, a comparing section for detecting whether motor current detection values have exceeded a restriction level, an induction voltage calculating section for calculating induction voltages of the motor, a switching section, and a PWM pattern generating section. When the comparing section detects that the motor current detection values have exceeded the restriction level, the switching section supplies the induction voltages calculated by the induction voltage calculating section to the converter as output voltage instruction values.

6 Claims, 7 Drawing Sheets

MOTOR DRIVING APPARATUS

BACKGROUND OF THE INVENTION AND RELATED ART STATEMENT

The present invention relates to a motor driving apparatus which drives a motor by converting polyphase AC voltages into ones having a desired magnitude and frequency by means of an AC/AC direct converter such as a matrix converter. In particular, the invention relates to a motor driving apparatus which enables continuous operation of a power converter while preventing its overheat or damage of a motor or the power converter by restricting the amplitude of the motor currents.

In power converters for driving a motor as typified by inverters and matrix converters, to prevent overheat or damage of the motor or the power converter, a protection device is provided which monitors the amplitude of the motor currents and stops operation of the power converter by turning off all semiconductor switching devices constituting the protection device when the motor currents have exceeded a limit level.

However, a sudden stop of operation of the power converter causes sharp variations in the voltages applied to the motor and may damage the motor or driving devices connected thereto. Furthermore, this kind of control is not suitable for use in the power converter that the continuous operation is desired.

JP-A-2004-180390 (paragraphs 0015-0018, FIG. 1, etc.) discloses a conventional technique as a countermeasure against the above problems in which a restriction level lower than the limit level is set. When the motor currents have exceeded the restriction level, the power converter is kept in operation while further increase in the motor currents is prevented.

Figure 5:
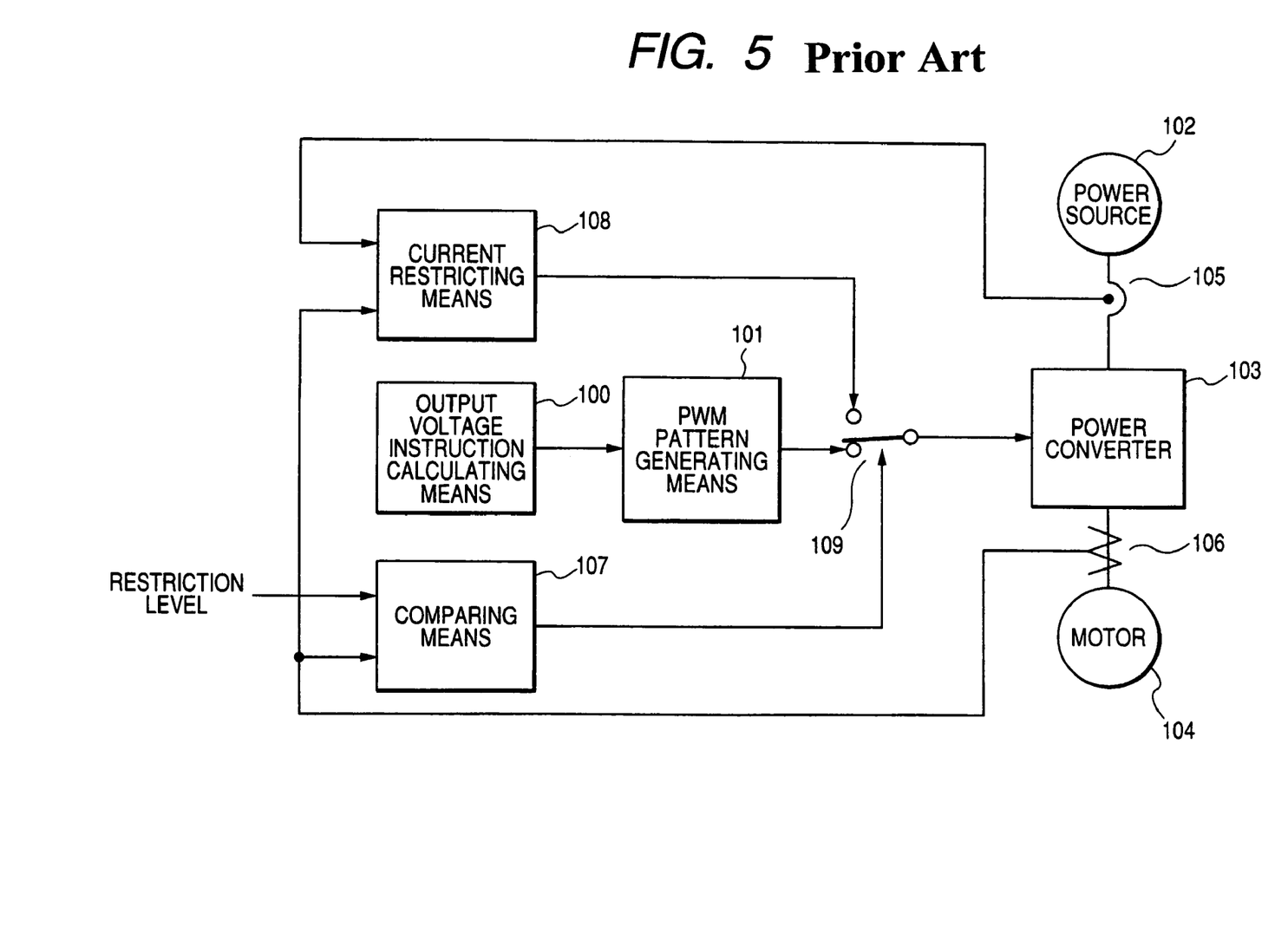
FIG. 5 is a block diagram of an important part of a conventional apparatus.

FIG. 5 is a block diagram of an important part of a conventional apparatus disclosed in JP-A-2004-180390. In FIG. 5, reference numerals 102-104 denote a power source, a power converter, and a motor, respectively. Output voltage instruction calculating means 100 calculates output voltage instruction values for the power converter 103. On the basis of the output voltage instruction values, PWM pattern generating means 101 calculates PWM patterns according to which the semiconductor switching devices of the power converter 103 are turned on/off.

On the other hand, current restricting means 108 receives power source voltages detected by the power source voltage detecting means 105 and motor currents detected by motor current detecting means 106, and calculates and outputs PWM patterns to be used for generating output voltage vectors which are opposite in directions to current vectors calculated from the motor current detection values.

Reference numeral 107 denotes comparing means in which a restriction level lower than a motor current limit level is set. The comparing means 107 compares the motor current detection values with the restriction level.

If the motor currents have exceeded the restriction level, switching means 109 is switched to the current restricting means 108 side in accordance with the output of the comparing means 107, whereby PWM patterns for generating output voltage vectors that are opposite in directions to current vectors are supplied to the power converter 103 via the switching means 109.

With the above measure, the motor currents decrease and their amplitude can be made lower than or equal to the restriction level. As a result, overcurrent can be prevented from flowing through the motor 104 while the power converter 103 is kept in operation.

In connection with the conventional technique of the above-mentioned JP-A-2004-180390, Japanese Patent Application No. 2005-238593, which was filed earlier than this application and was not laid open as of the filing date of this application, discloses an invention in which to reduce output current ripples by lowering the calculation load, a power converter is caused to output zero voltages.

Figure 6:
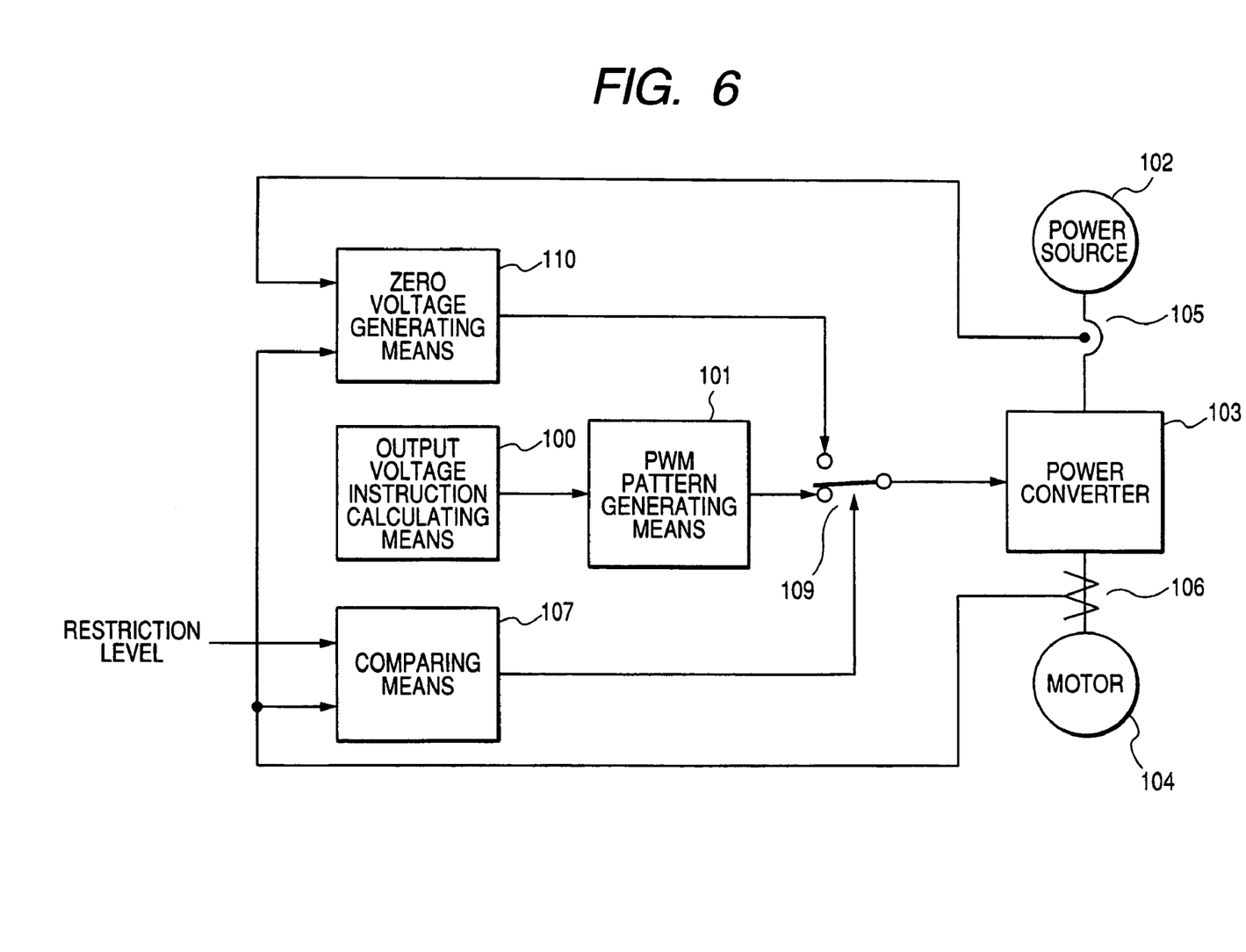
FIG. 6 is a block diagram of an important part of an apparatus according to an earlier-filed invention.

FIG. 6 is a block diagram of an important part of an apparatus according to the above earlier-filed invention. In FIG. 6, components having the same functions as corresponding components shown in FIG. 5 are given the same reference numerals.

The apparatus of FIG. 6 is different from that of FIG. 5 in that zero voltage generating means 110 is provided in place of the current restricting means 108. The zero voltage generating means 110 selects and outputs, on the basis of the power source voltages, PWM patterns such that all the output phase voltages are made identical.

In the above configuration, when the motor currents have become higher than the restriction level, PWM patterns are supplied from the zero voltage generating means 110 to the power converter 103 via the switching means 109. For example, the power converter 103 outputs a maximum phase voltage of the power source 102 for all the output phases. The line voltages become zero when the voltages of all the output phases are the same. Therefore, the motor currents decrease and their amplitude does not exceed the restriction level.

The conventional technique of JP-A-2004-180390 shown in FIG. 5 provides a great current reducing effect because voltage vectors which are opposite in directions to motor current vectors are output. However, large ripples appear in the output currents because the output voltages of the power converter 103 are changed sharply.

Where the power converter 103 is an AC/AC direct converter such as a matrix converter, the input currents are also distorted if ripples exist in the output currents because the power source 102 is directly connected to the motor 104 by bidirectional semiconductor switches. Ripples in the output currents are not preferable because they may cause a torque ripple or noise in the motor 104. And ripples in the input currents are not preferable either because they may cause erroneous operations or the like in other apparatus which are connected to the power source 102.

On the other hand, in the earlier-filed invention shown in FIG. 6, the motor currents may increase rather than decrease under such operation conditions that the energy is returned from the motor 104 to the power converter 103 (regeneration) as in the case of a braking operation.

The reason why the motor currents increase if the power converter 103 output zero voltages during a regenerative operation will be described below.

Figure 7:
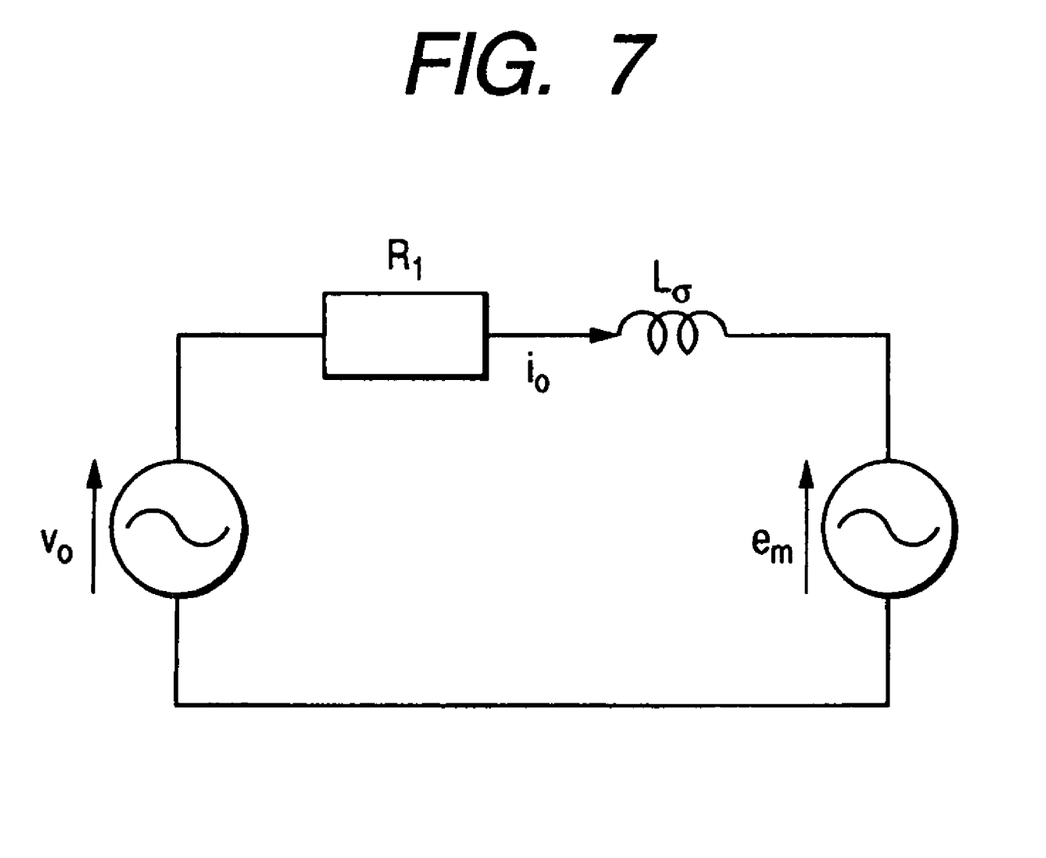
FIG. 7 is a one-output-phase circuit diagram in a case that a synchronous motor is driven by a matrix converter in the earlier-filed invention.

FIG. 7 is a one-output-phase circuit diagram of a matrix converter in a case that a synchronous motor as the motor 104 is driven by a matrix converter as the power converter 103 of FIG. 6. The motor current during a driving operation is given by the following Equation (1):

$$i_o = \frac{1}{R_1 + j\omega L_\sigma}(v_o - e_m) \tag{1}$$

where $v_o$ is an output voltage of the matrix converter, $e_m$ is an induction voltage generated by the motor, $R_1$ is a primary winding resistance of the motor, $L_\sigma$ is a primary synchronous inductance, and $\omega$ is a primary angular frequency.

On the other hand, the motor current during a regenerative braking operation is given by the following Equation (2):

$$i_o = \frac{1}{R_1 + j\omega L_\sigma}(e_m - v_o) \quad (2)$$

It is seen that the signs of the output voltage $v_o$ and the induction voltage $e_m$ in Equation (2) are opposite to those in Equation (1). In the configuration of FIG. 6, suddenly changing the output voltage of the matrix converter (power converter 103) to zero means that $v_o$ is made equal to "0" in Equation (1) (driving operation). The motor current $i_o$ is thereby decreased. However, if $v_o$ is made equal to "0" in Equation (2) (regenerative braking operation), the value ($e_m - v_o$) on the right side becomes larger than that before $v_o$ is made equal to "0" and hence the motor current $i_o$ increases contrary to the intention. Referring to the circuit diagram of FIG. 7, when $v_o$ is made equal to "0", short-circuiting is caused for the induction voltage $e_m$ in the matrix converter and the current $i_o$ is thereby increased.

A current restriction method of a voltage-type inverter having an energy buffer is known in JP-A-3-74175 (Japanese Patent No. 2,745,691). This document discloses a technique that when the magnitude of a current vector has become larger than a restriction value, a voltage vector that is closest in position to a vector that is opposite in direction to the current vector is selected and the voltage-type inverter is caused to output.

However, in direct converters such as matrix converters, the PWM pulse generation method is different from the method in inverters. Therefore, it is difficult to apply the above conventional technique to direct converters as it is.

An object of the present invention is therefore to provide a motor driving apparatus which drives a motor by means of an AC/AC direct converter such as a matrix converter and which does not cause ripples even in the event of sharp variations in the motor currents, can reduce the motor currents in each of a driving operation and a braking (regenerative braking) operation, and can keep safe operation of the direct converter.

Further objects and advantages of the invention will be apparent from the following description of the invention.

SUMMARY OF THE INVENTION

To attain the above object, the invention provides a motor driving apparatus in which a motor is driven by an AC/AC direct converter for directly converting polyphase AC voltages to polyphase AC voltages having a desired magnitude and frequency and the converter is operated by supplying first output voltage instruction values when motor currents are lower than or equal to a restriction level. The motor driving apparatus comprises current detecting means for detecting motor currents; comparing means for detecting whether motor current detection values have exceeded the restriction level; induction voltage calculating means for calculating induction voltages of the motor; and means for supplying the induction voltages calculated by the induction voltage calculating means to the converter as second output voltage instruction values instead of the first output voltage instruction values when the comparing means detects that the motor current detection values have exceeded the restriction level.

In the above motor driving apparatus, the induction voltage calculating means may calculate induction voltages using the first output voltage instruction values, the motor current detection values, and motor electric constants.

In the above motor driving apparatus, the induction voltage calculating means may calculate induction voltages using output voltage detection values of the converter, the motor current detection values, and motor electric constants.

In the invention, to restrict the amplitude of the motor currents, induction voltages of the motor are calculated and supplied to the power converter as second output voltage instruction values instead of the first output voltage instruction values for an ordinary operation. The output voltages of the power converter are thus made equal to the induction voltages.

As a result, the motor currents can be made lower than or equal to the restriction level irrespective of the motor operation state such as a driving state and a braking state. No sharp variations occur in the output voltages of the power converter and its operation can be continued safely.

DETAILED DESCRIPTION OF THE EMBODIMENTS

Embodiments of the present invention will be hereinafter described with reference to the drawings.

Figure 1:
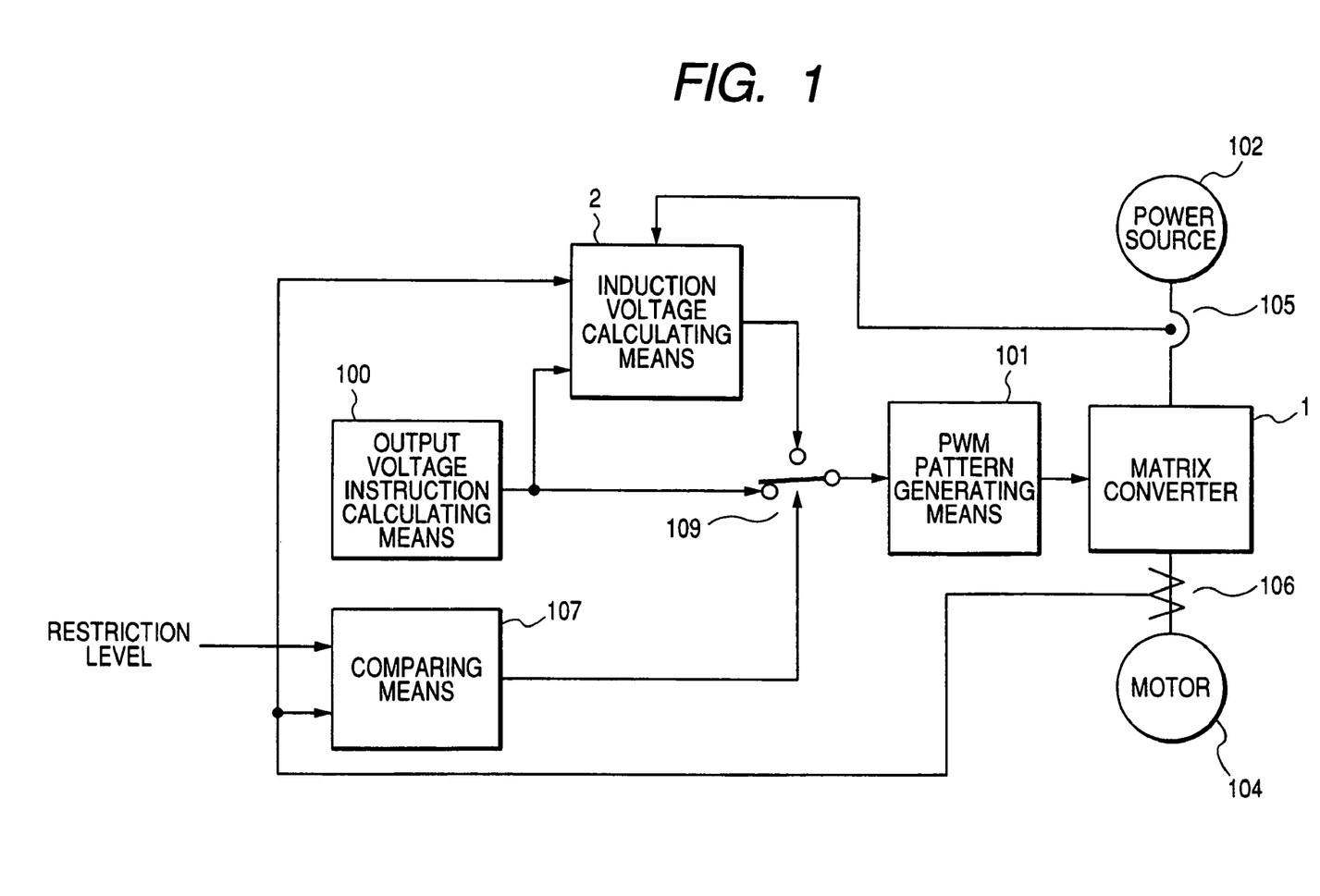
FIG. 1 is a block diagram of a first embodiment of the present invention.

FIG. 1 is a block diagram of a first embodiment of the invention. Components in FIG. 1 having the same functions as those shown in FIG. 5 or 6 are given the same reference numerals and will not be described below. That is, components having no corresponding components in FIG. 5 or 6 will mainly be described below.

In FIG. 1, reference numeral 1 denotes a matrix converter which is an AC/AC direct converter and is composed of plural bidirectional switches which connect the power source 102 and the motor 104 directly. For example, where the power source 102 is a three-phase AC power source and the motor 104 is a three-phase synchronous motor, nine bidirectional switches in total are connected between the three-phase input and output terminals. For example, each of these bidirectional switches is an inverted parallel connection of two semiconductor switching devices such as IGBTs having a high reverse breakdown voltage.

Reference numeral 2 denotes an induction voltage calculating means which calculates induction voltages generated by the motor 104. The induction voltage calculating means 2 receives motor current detection values coming from the motor current detecting means 106, power source voltage detection values coming from the power source voltage detecting means 105, and first output voltage instruction values (for an ordinary state in which the motor currents are equal to or lower than the restriction level) coming from the output voltage instruction calculating means 100. The induction voltages calculated by the induction voltage calculating means 2 are input to one set of switching terminals of the switching means 109 as second output voltage instruction values (for a state that the motor currents are higher than the restriction level and hence current restriction is necessary) for the matrix converter 1. The first output voltage instruction values which are output from the output voltage instruction calculating means 100 are input to the other set of switching terminals.

As in the cases of FIGS. 5 and 6, the switching means 109 switches between the sets of switching terminals in accordance with the output of the comparing means 107. If the comparing means 107 detects that the amplitude of the motor currents has exceeded the restriction level, the switching means 109 is switched to the induction voltage calculating means 2 side and induction voltages calculated by the means 2 are supplied, as output voltage instruction values, to the PWM pattern generating means 101 via the switching means 109.

The principle of the restriction of motor currents according to this embodiment will be described below.

It is seen from the above Equations (1) and (2) that if the relationship $v_o = e_m$ is established, the voltage drops generated by the primary windings of the motor become zero irrespective of whether the current operation is driving or braking and hence the motor currents can be reduced. That is, satisfactory results can be obtained by a control of making the output voltages of the matrix converter 1 equal to the induction voltages of the motor 104.

Figure 2:
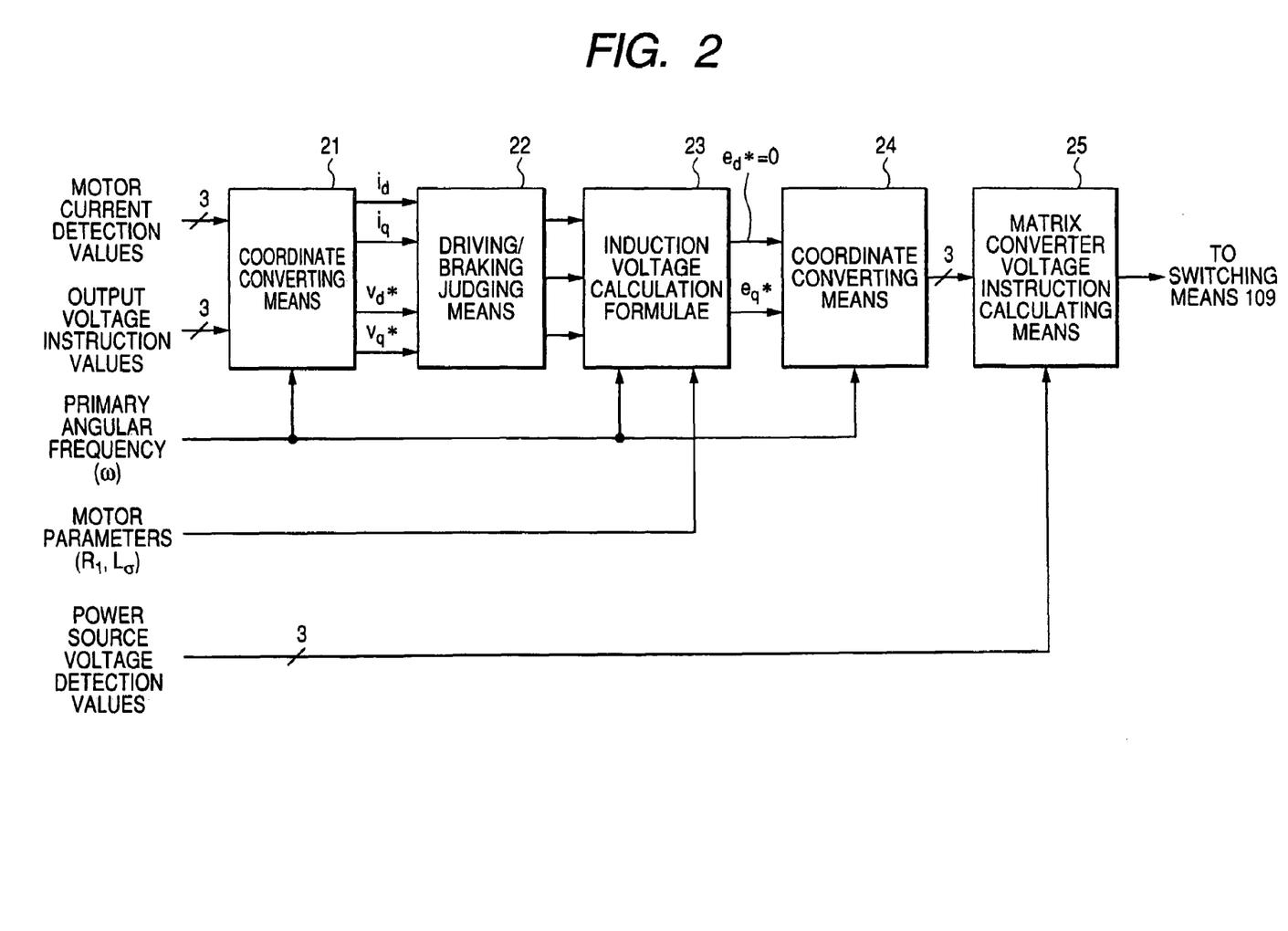
FIG. 2 is a block diagram showing the configuration of induction voltage calculating means shown in FIG. 1.

The configuration and workings of the induction voltage calculating means 2 will be described below with reference to FIG. 2. It is assumed that the motor 104 is a synchronous motor.

Let $v_u^*$, $v_v^*$, and $v_w^*$ represent the three-phase output voltage instruction values which are supplied from the output voltage instruction calculating means 100 to the PWM pattern generating means 101. Coordinate converting means 21 shown in FIG. 2 converts the output voltage instruction values $v_u^*$, $v_v^*$, and $v_w^*$ into orthogonal AC two-axis components $v_\alpha^*$ and $v_\beta^*$ according to the following Equation (3):

$$\begin{bmatrix} v_\alpha^* \\ v_\beta^* \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} v_u^* \\ v_v^* \\ v_w^* \end{bmatrix} \quad (3)$$

Likewise, the coordinate converting means 21 converts the three-phase motor current detection values $i_u$, $i_v$, and $i_w$ into orthogonal AC two-axis components $i_\alpha$ and $i_\beta$ according to the following Equation (4):

$$\begin{bmatrix} i_\alpha \\ i_\beta \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ i_w \end{bmatrix} \quad (4)$$

Furthermore, the coordinate converting means 21 converts the set of $v_\alpha^*$ and $v_\beta^*$ and the set of $i_\alpha$ and $i_\beta$ into the coordinates (of the d-q coordinate system) that rotate at the primary angular frequency $\omega$ according to the following Equations (5) and (6), respectively, where $\theta = \int \omega dt$ may be obtained from the speed detection value detected by a speed sensor, the speed instruction value, or the speed estimation value.

$$\begin{bmatrix} v_d^* \\ v_q^* \end{bmatrix} = \begin{bmatrix} \cos\theta & \sin\theta \\ -\sin\theta & \cos\theta \end{bmatrix} \begin{bmatrix} v_\alpha^* \\ v_\beta^* \end{bmatrix} \quad (5)$$

$$\begin{bmatrix} i_d \\ i_q \end{bmatrix} = \begin{bmatrix} \cos\theta & \sin\theta \\ -\sin\theta & \cos\theta \end{bmatrix} \begin{bmatrix} i_\alpha \\ i_\beta \end{bmatrix} \quad (6)$$

Driving/braking judging means 22 calculates the instantaneous effective power p from $v_d^*$, $v_q^*$, $i_d$, and $i_q$ according to the following Equation (7):

$$p = v_d^* i_d + v_q^* i_q \quad (7)$$

If $p \geq 0$, the driving/braking judging means 22 judges that the current operation is driving and outputs a driving judgment signal. If $p < 0$, the driving/braking judging means 22 judges that the current operation is braking (regenerative braking) and outputs a braking judgment signal. In the synchronous motor, the positions of the stator and the rotor are the same and hence the d-axis component $e_d$ of the induction voltages is equal to zero. On the other hand, the q-axis component $e_q$ of the induction voltages is calculated according to the following Equations (8) which is based on the voltage equations of the motor. The motor parameters (motor electric constants) $R_1$ and $L_\sigma$ in Equations (8) may be either measurement values or estimated values.

$$e_q = v_q^* - \omega L_\sigma i_d - R_1 i_q - \omega L_\sigma \frac{di_q}{dt} \quad \because p \geq 0 \quad (8)$$

$$e_q = v_q^* - \omega L_\sigma i_d - R_1 i_q - \omega L_\sigma \frac{di_q}{dt} \quad \because p < 0$$

A coordinate converting means 24 converts the d-axis component $e_d(=0)$ and the q-axis component $e_q$ of the induction voltages which are instruction values obtained by a calculation block 23 corresponding to Equations (8) into the three-phase AC voltage components $e_u^*$, $e_v^*$, and $e_w^*$.

Unlike an inverter, the matrix converter obtains voltages by directly PWM-controlling the power source voltages. Therefore, to produce desired induction voltages, amplitude information of the power source voltages is necessary. Therefore, matrix converter voltage instruction calculating means 25 calculates the output voltage instruction values $\lambda_u^*$, $\lambda_v^*$, and $\lambda_w^*$ by correcting $e_u^*$, $e_v^*$, and $e_w^*$ by dividing those by the magnitude $|V_i|$ of the power source voltages according to the following Equation (9) and outputs $\lambda_u^*$, $\lambda_v^*$, and $\lambda_w^*$ to the switching means 109 as the second output voltage instruction values.

$$\begin{bmatrix} \lambda_u^* \\ \lambda_v^* \\ \lambda_w^* \end{bmatrix} = \begin{bmatrix} e_u^* \\ e_v^* \\ e_w^* \end{bmatrix} \frac{1}{|V_i|} \quad (9)$$

where $$|V_i| = \sqrt{v_{i\alpha}^2 + v_{i\beta}^2}$$

and $v_{i\alpha}$ and $v_{i\beta}$ are the AC two-axis components of the power source voltages.

Various methods are available as a method for thereafter calculating on/off periods of the semiconductor switching devices of the matrix converter 1, but it will not be described because it is not an essential part of the invention.

When the motor currents have exceeded the restriction level, the switching means 109 shown in FIG. 1 selects the second output voltage instruction values (see Equation (9)) in accordance with the output of the comparing means 107 and outputs those to the PWM pattern generating means 101. When the motor currents have decreased to become lower than the restriction level, the switching means 109 again selects the first output voltage instruction values (for an ordinary state) coming from the output voltage instruction calculating means 100 and gives those to the PWM pattern generating means 101 to drive in an ordinary operation.

As described above, according to this embodiment, when the motor currents have exceeded the restriction level, the motor currents are restricted by switching the output voltage instruction values to the values that are equal to the induction voltages of the motor instead of changing the PWM patterns themselves. This makes it possible to prevent increase of ripples in the output currents which would otherwise occur due to sharp variations of the pulse patterns, and to thereby reduce ripples in the input currents, The above-described induction voltage calculation method according to the first embodiment, that is, the configuration shown in FIG. 2, is just an example. Calculations may be performed with the variables kept in AC component form (i.e., no coordinate conversion is done). And an induction voltage observer may be employed to estimate induction voltages according to a motor model. In addition, the motor 104 of this embodiment is not limited to a synchronous motor and may be an induction motor if Equations (8) are modified according to the voltage equations of the motor.

Figure 3:
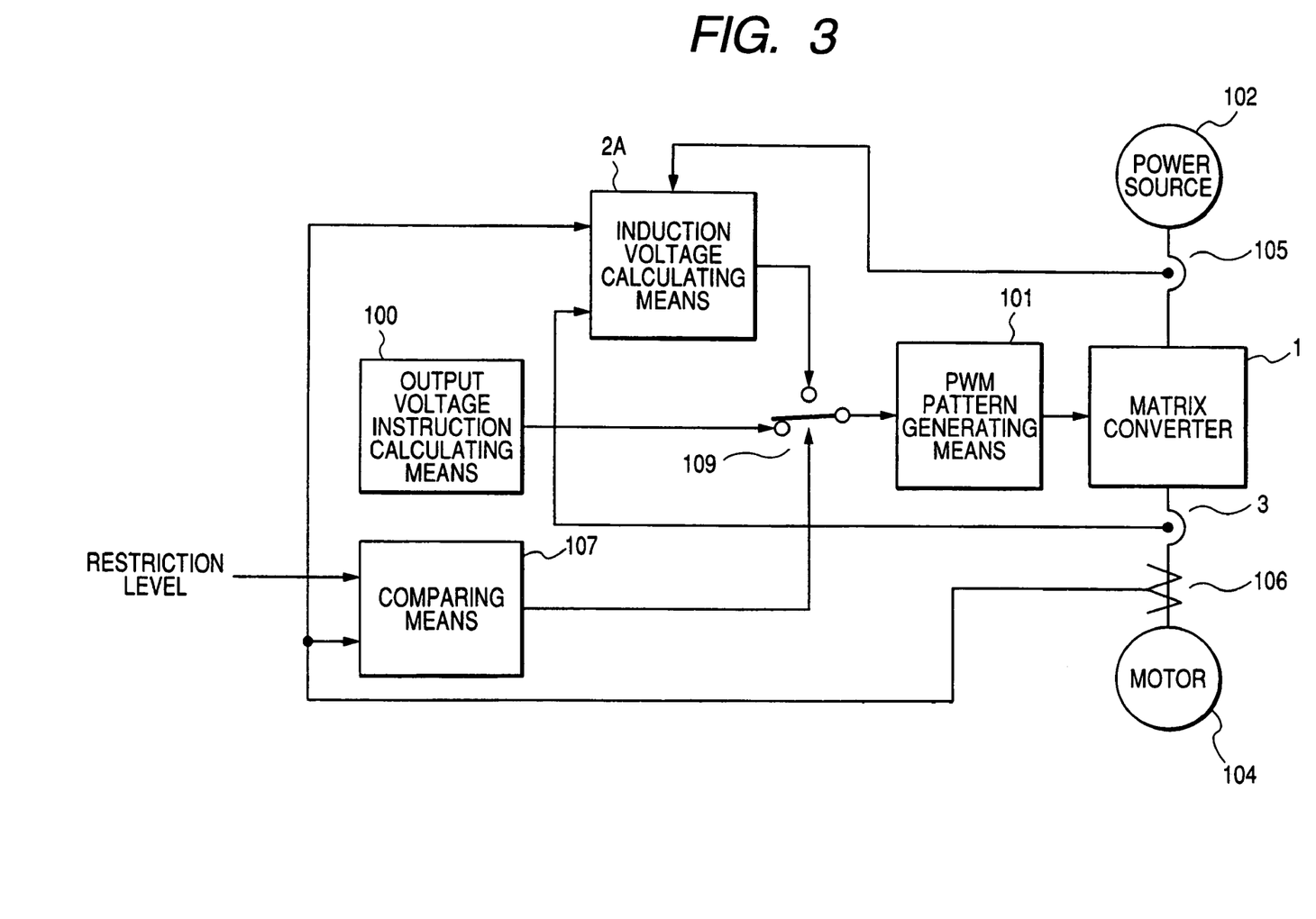
FIG. 3 is a block diagram of a second embodiment of the invention.

FIG. 3 is a block diagram of a second embodiment of the invention. This embodiment is different from the first embodiment in that the output voltage detection values of the matrix converter 1 are used for calculating induction voltages.

That is, output voltage detecting means 3 is added to the configuration of FIG. 1, and voltage detection values of the output voltage detecting means 3 are input to induction voltage calculating means 2A and used to calculate induction voltages.

In the first embodiment, if the induction voltages include calculation errors, the output voltage instruction values do not coincide with the true induction voltages while the motor currents are restricted and the relationship $v_o = e_m$ is not established in Equation (1) or (2), whereby the motor current restriction effect is lowered. The induction voltage calculation error includes various errors such as errors in the motor parameters and an error due to calculation delay, and its dominant parts are commutation errors of the semiconductor switching devices (i.e., voltage errors caused by the fact that halt periods are provided in switching patterns to prevent both of power source short-circuiting and load end opening in the matrix converter) and an output voltage error due to on-voltage drops across the semiconductor switching devices.

In view of the above, in the second embodiment, output voltages that are actually applied to the motor 104 by the matrix converter 1 are detected and induction voltages are calculated by using the voltage detection values so that the calculation errors are reduced and the relationship $v_o = e_m$ is always established in Equation (1) or (2) and that the motor current restriction effect is thereby enhanced.

Figure 4:
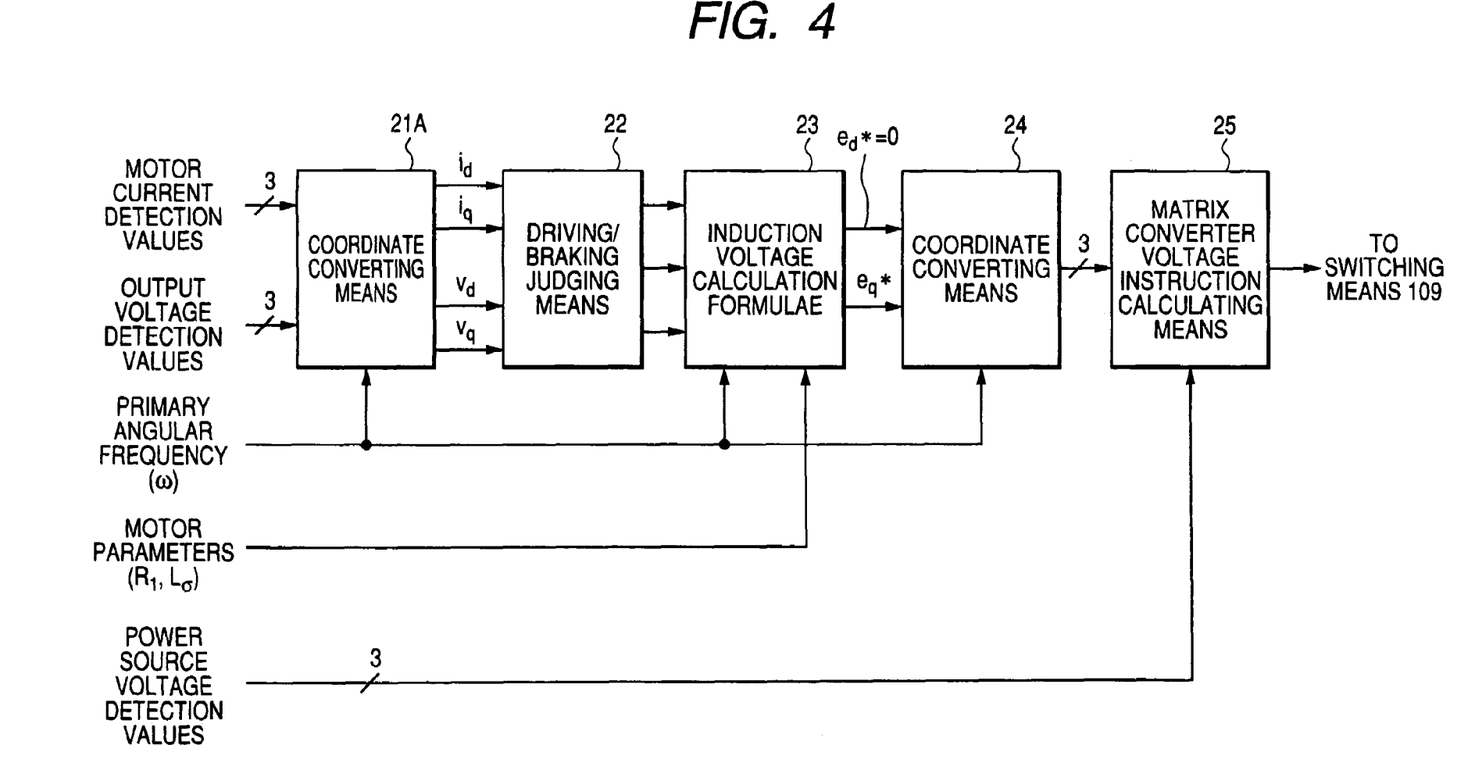
FIG. 4 is a block diagram showing the configuration of induction voltage calculating means shown in FIG. 3.

FIG. 4 is a block diagram of the induction voltage calculating means 2A shown in FIG. 3. As shown in FIG. 4, voltage detection values detected by the output voltage detecting means 3 shown in FIG. 3 are input to coordinate converting means 21A, which calculates the two-axis components $v_d$ and $v_q$ of the rotary coordinate system through coordinate conversion in the same manner as in the first embodiment. That is, the two-axis components $v_\alpha$ and $v_\beta$ are calculated by using the voltage detection values $v_u$, $v_v$, and $v_w$ instead of $v_u^*$, $v_v^*$, and $v_w^*$ which are used in Equation (3). And the two-axis components $v_d$ and $v_q$ are calculated by using $v_\alpha$ and $v_\beta$ instead of $v_\alpha^*$ and $v_\beta^*$ which are used in Equation (5).

Then, the q-axis component $e_q$ of the induction voltages is calculated by the calculation block 23 by using $v_q$ instead of $v_q^*$ which is used in Equations (8). And the thus-calculated q-axis component $e_q$ and the d-axis-component $e_d$ (instruction values), instead of $e_q^*$ and $e_d^*$ (=0), are converted into the three-phase AC voltage components $e_u^*$, $e_v^*$, and $e_w^*$ by the coordinate converting means 24. The subsequent calculations will not be described because they are the same as shown in FIG. 2.

According to this embodiment, since the induction voltages calculated by using actual output voltages of the matrix converter 1 are output as output voltage instruction values for a current restricting operation, the induction voltage calculation errors are reduced and the relationship $v_o = e_m$ can always be established in Equation (1) or (2). As a result, the motor currents are restricted reliably and the power converter can be operated continuously.

In each of the above embodiments, the switching means 109 is provided between the induction voltage calculating means 2 or 2A and the PWM pattern generating means 101. However, an alternative configuration is possible in which PWM patterns are generated in advance on the basis of calculated induction voltages and stored in storage means, switching means is provided between the PWM pattern generating means 101 and the matrix converter 1, and PWM patterns for an ordinary operation which are supplied from the PWM pattern generating means 101 or the PWM patterns for a current restricting operation which are stored in the storage means are selected by the switching means and supplied to the matrix converter 1.

The disclosure of Japanese Patent Application No. 2005-266405 filed Sep. 14, 2005 is incorporated as a reference.

While the invention has been explained with reference to the specific embodiments of the invention, the explanation is illustrative and the invention is limited only by the appended claims.

What is claimed is:

1. A motor driving apparatus for driving a motor by AC/AC direct converter for directly converting polyphase AC voltages to polyphase AC voltages having a desired magnitude and frequency, said motor driving apparatus comprising:
   current detecting means for detecting motor currents;
   comparing means for detecting whether detection values of the motor currents have exceeded a restriction level;
   induction voltage calculating means for calculating induction voltages of the motor; and
   means for supplying the induction voltages calculated by the induction voltage calculating means to the converter as second output voltage instruction values instead of first output voltage instruction values when the comparing means detects that the detection values of the motor currents have exceeded the restriction level.

2. A motor driving apparatus according to claim 1, wherein said motor driving apparatus supplies the first output voltage instruction values to the converter when the motor currents are lower than or equal to the restriction level.

3. A motor driving apparatus according to claim 1, wherein the induction voltage calculating means calculates induction voltages using the first output voltage instruction values, the motor current detection values, and motor electric constants.

4. A motor driving apparatus according to claim 1, wherein the induction voltage calculating means calculates induction voltages using output voltage detection values of the converter, the motor current detection values, and motor electric constants.

5. A motor driving apparatus according to claim 1, further comprising power source voltage detecting means for detecting voltages supplied to the converter, and output voltage instruction calculating means for calculating voltages of the converter to be operated, said induction voltage calculating means being connected to the power source voltage detecting means, the output voltage instruction calculating means and the motor current detecting means.

6. A motor driving apparatus according to claim 5, further comprising output voltage detecting means for detecting voltages between the converter and the motor, said output voltage detecting means being connected to the induction voltage calculating means.

* * * * *

UNITED STATES PATENT AND TRADEMARK OFFICE
CERTIFICATE OF CORRECTION

PATENT NO.         : 7,436,147 B2                                    Page 1 of 1
APPLICATION NO. : 11/700886
DATED              : October 14, 2008
INVENTOR(S)        : Ikuya Sato et al.

It is certified that error appears in the above-identified patent and that said Letters Patent is hereby corrected as shown below:

Please change column 7, line 20, "currents," to --currents.--.

Signed and Sealed this

Seventeenth Day of February, 2009

JOHN DOLL
*Acting Director of the United States Patent and Trademark Office*